(12) United States Patent
Moran et al.

(10) Patent No.: US 10,459,716 B2
(45) Date of Patent: Oct. 29, 2019

(54) PROCESSING DIGITAL CONTENT

(71) Applicant: Arm IP Limited, Cambridge (GB)

(72) Inventors: Brendan Moran, Histon (GB); Milosch Meriac, Cambridge (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 15/756,129

(22) PCT Filed: Aug. 23, 2016

(86) PCT No.: PCT/GB2016/052608
§ 371 (c)(1),
(2) Date: Feb. 28, 2018

(87) PCT Pub. No.: WO2017/042534
PCT Pub. Date: Mar. 16, 2017

(65) Prior Publication Data
US 2018/0246714 A1    Aug. 30, 2018

(30) Foreign Application Priority Data
Sep. 8, 2015 (GB) .................................. 1515876.9

(51) Int. Cl.
*G06F 8/65* (2018.01)
*G06F 9/46* (2006.01)

(52) U.S. Cl.
CPC ............... *G06F 8/66* (2013.01); *G06F 9/466* (2013.01)

(58) Field of Classification Search
CPC ..... G06F 8/61; G06F 8/65; G06F 8/66; G06F 9/46; G06F 9/466

USPC .................................................. 717/168–178
See application file for complete search history.

(56) References Cited

U.S. PATENT DOCUMENTS

| | | | | |
|---|---|---|---|---|
| 6,298,478 | B1 * | 10/2001 | Nally | G06F 9/466 717/170 |
| 6,457,065 | B1 * | 9/2002 | Rich | G06F 9/466 707/E17.005 |
| 9,032,386 | B1 | 5/2015 | Vaynshteyn et al. | |
| 2002/0012320 | A1 * | 1/2002 | Ogier | H04L 1/1614 370/252 |
| 2006/0059481 | A1 | 3/2006 | Smith et al. | |
| 2007/0006208 | A1 * | 1/2007 | Nguyen | G06F 11/1433 717/168 |

(Continued)

FOREIGN PATENT DOCUMENTS

EP    2479667    7/2012

OTHER PUBLICATIONS

GB Intellectual Property Office, GB1515876.9, Combined search and examination report, dated Jan. 13, 2016.

(Continued)

*Primary Examiner* — Marina Lee
(74) *Attorney, Agent, or Firm* — Leveque IP Law, P.C.

(57) ABSTRACT

A machine-implemented method or data processing component for controlling the processing of digital content from plural sources by at least one data processing device comprises receiving at least two digital content manifests at the data processing device; receiving at least one digital content payload at the data processing device; and responsive to the at least two digital content manifests, performing an atomic action using the at least one digital content payload.

20 Claims, 3 Drawing Sheets

(56) References Cited

U.S. PATENT DOCUMENTS

| | | | |
|---|---|---|---|
| 2009/0006808 A1* | 1/2009 | Blumrich | G06F 15/17337 |
| | | | 712/12 |
| 2009/0217255 A1* | 8/2009 | Troan | G06F 8/65 |
| | | | 717/168 |
| 2010/0017809 A1* | 1/2010 | Bryant-Rich | G06F 9/4411 |
| | | | 719/327 |
| 2011/0113419 A1 | 5/2011 | Ewington et al. | |
| 2012/0042301 A1* | 2/2012 | Grechanik | G06F 16/24526 |
| | | | 717/124 |
| 2013/0332917 A1* | 12/2013 | Gaither | G06F 8/656 |
| | | | 717/170 |
| 2014/0053145 A1 | 2/2014 | Steigleder | |
| 2017/0131994 A1* | 5/2017 | Middleton | G06Q 30/0261 |
| 2018/0246714 A1* | 8/2018 | Moran | G06F 9/466 |

OTHER PUBLICATIONS

European Patent Office, PCT/GB2016/052608, PCT ISR and Written Opinion, dated Oct. 13, 2016.
GB Intellectual Property Office, GB1515876.9, Combined search and examination report, dated Dec. 12, 2017.

* cited by examiner

PROCESSING DIGITAL CONTENT

FIELD OF THE DISCLOSURE

The present disclosure relates to the processing of received digital content by data processing devices, and more particularly to the processing of digital content payloads and associated manifests.

BACKGROUND

Since the advent of the Internet, there has been a rapid increase in the interconnectedness of devices capable of storing, processing and communicating data. Now, with the development of what is called the Internet of Things (IoT), devices which were not conventionally equipped to store, process and communicate data are becoming so equipped. For example, a heating system in the home may gather information from various temperature sensors and control the activation of heaters based on the gathered information; a factory pollution monitoring sensor may gather information from various chemical sensors and arrange maintenance based on the gathered information; while a healthcare provider may use wireless sensors, such as heart rate monitors, to track the health of patients while they are at home.

A further example is that of a domestic refrigerator that is provided with the capability to recognise encoded data associated with a perishable food item, store the data in device storage, and subsequently, on being triggered by a program that monitored the data, warn a user over a network to a smartphone of an impending "use by" date for the food item. For the purposes of the present disclosure, such devices will be referred to as "data processing devices", as they are capable of processing data in some way, even though they may have other, primary functions, as in the refrigerator example.

There are ever-increasing numbers of such devices within the home, office buildings or the outdoor environment that have data processing and communication capabilities which allow such devices to interact with other data processing devices and cloud services. Everyday objects and relatively small scale data processing devices may be connected to each other and to central platforms as part of the IoT.

Typically, such data processing devices need to receive digital content by online means such as over the Internet or an intranet, or by offline means, such as from a digital recording device or medium, such as a data-stick. The digital content may comprise data or executable entities, such as firmware to control the operation of the data processing device itself. Typically, digital content is accompanied by, and has its downstream activity controlled by, a manifest— that is, a metadata file in a format that can be recognised and acted upon by a receiver device in its subsequent handling of the digital content.

Numerous difficulties are faced by those implementing ways of distributing and controlling digital content—for example, there are always questions as to the trustworthiness of content, it may be necessary to time the enablement of the digital content, multiple provider organizations of parts of the content may need to have their individual content items coordinated while the organisations remain separate and independent. It is important also to protect devices from accidental misconfiguration by ensuring that they only update their configuration data with appropriate updates. Further, the nature of the IoT environment is such that it is impossible to secure the entire IoT infrastructure, and thus there is a need to prevent malicious activity hidden in the distribution of digital content. For example, in certain circumstances, networks that include devices that have installed malicious content may be open to man-in-the-middle attacks.

These and numerous other difficulties are faced by those of skill in the data processing art who work in the field of processing of received digital content by data processing devices.

DESCRIPTION OF THE DRAWINGS

Embodiments of the disclosed technology will now be described, by way of example only, with reference to the appended drawings, in which.

DETAILED DESCRIPTION

In a first aspect of the disclosed technology there is provided a machine-implemented method for controlling the processing of digital content from plural sources by at least one data processing device, the method comprising: receiving at least two digital content manifests at the data processing device; receiving at least one digital content payload at the data processing device; and responsive to the at least two digital content manifests, performing an atomic action using the at least one digital content payload.

In a second aspect of the disclosed technology there is provided a data processing component for controlling the processing of digital content from plural sources by at least one data processing device, comprising: a receiver operable to receive at least two digital content manifests at the data processing device; the receiver further operable to receive at least one digital content payload at the data processing device; and an atomic action processor responsive to the at least two digital content manifests, and operable to perform an atomic action using the at least one digital content payload.

In a related aspect of the disclosed technology there is provided a computer program product, stored in a computer-readable medium and comprising computer program code to, when loaded into a computer system and executed thereon, cause said computer system to perform a method for controlling the processing of digital content from plural sources by at least one data processing device, the method comprising: receiving at least two digital content manifests at said data processing device; receiving at least one digital content payload at said data processing device; and responsive to said at least two digital content manifests, performing an atomic action using said at least one digital content payload.

Figure 1:
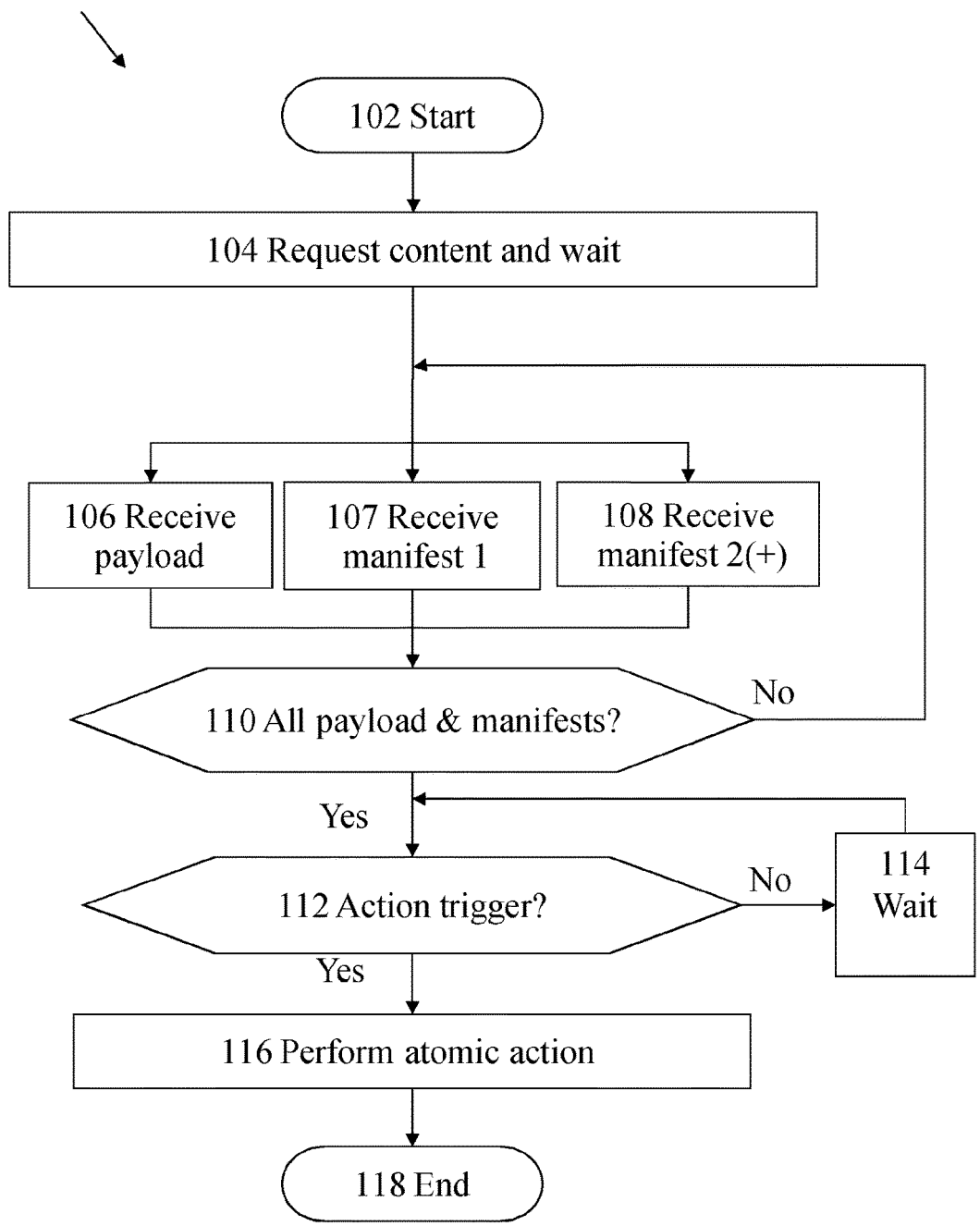
FIG. 1 shows one exemplary method for processing digital content according to aspects of the disclosed technology.

Turning now to FIG. 1 of the appended drawings, there is shown one exemplary method for processing digital content according to aspects of the disclosed technology. In FIG. 1 is shown a machine-implemented method 100 for controlling the processing of digital content from plural sources by a data processing device. The method 100 begins at Start step 102, and at optional step 104, a request for content is sent, after which the processing device enters a wait state. At step 106, the data processing device receives a payload of digital content. At steps 107 and 108, the data processing device receives at least two digital content manifests.

The communication means by which payloads and manifests are distributed may vary. For example, payloads and manifests may be provided by means of USB mass storage, server APIs, UART, ZigBee, Bluetooth Low Energy (BLE), Ethernet, Wi-Fi and the like. Thus the data processing device may be provided with a port for physical insertion of a USB device for direct provision of payloads and manifests, or it may be attached to a wired or wireless network, which may be a tree structure or a mesh structure of member nodes. In a communications network, the payloads and manifests may be communicated as, for example, point to point transmissions or broadcasts. In many cases, the payloads and manifests may be communicated using a mixture of broadcast and point to point. For example, content applicable to a class of devices may be broadcast, while additional, related content applicable to a single device may be transmitted point to point.

One refinement, in a network in which the payloads and manifests are broadcast, is to define certain nodes as recipient nodes—after all, the network may comprise heterogeneous devices, not all of which may require a particular firmware update. In such a case, the received content is not acted upon by a device defined as a non-recipient device. Optionally, such a non-recipient device may route the content onward, and preferably only to nodes that are defined as recipient nodes.

As indicated at step 108, chains comprising more than two manifests are possible, and would be especially useful in cases where multiple providers of content have a need for coordination of activities performed by the data processing device on their content payloads. The order in which payload and manifests are received is unimportant, as the plurality of manifests and the payload must all be available for the data processing device to begin to act. This ensures that, for example, a timed update is only performed at the time a "triggering" manifest is received and activated. It also ensures that, where the trustworthiness of the digital content payload must be ascertained, no action will be taken until the manifest containing the appropriate certificate is received.

At test step 110, the data processing device tests for the presence or availability of all the corresponding payload and manifest objects. If the test at step 110 returns a negative result, processing returns to the wait state of step 104, and the test of test step 110 is repeated at intervals. If the test at step 110 returns a positive result, the data processing device proceeds to test step 112 to test for a "trigger"—such as, for example, expiry of a time delay set by a manifest, the presence of an appropriate certificate of trustworthiness in a manifest, or simply the completion of a chain of manifests relating to a particular payload—and if such a trigger is not encountered, the data processing device enters a further wait state at step 114 and the test of test step 112 is repeated at intervals. If the test at test step 112 returns a positive result, the data processing device performs an atomic action (such as an update or replacement of configuration or provisioning data, or executable firmware code) at step 116 using said at least one digital content payload. The method ends at step 118. In exemplary embodiments, the process of receiving manifests may comprise receiving certificate authority lists or key revocation lists to control access to content by recipient devices.

Atomic actions, as is well known to those of skill in the computing art, are actions that are performed in an "all-or-nothing" manner. An example from everyday life is the use of an ATM machine to draw cash from a bank account. It is desirable that the provision of the cash to the customer and the debiting of the customer's account are actions that are tied together in such a way that the customer will not receive cash without the account being debited, and nor will the account be debited without the customer receiving the cash. The computer system that underlies the ATM is thus adapted to ensure that if no cash can be given, any update to the customer's account will be backed out, and that if any update to the customer's account fails, the cash release instruction to the ATM will be cancelled.

One way in which the atomic action of step 116 may be controlled is by incorporating into the manifests one or more control commands, such as: an APPLY NOW command to cause the processing of digital content immediately; an APPLY TIMER command to set a timer on expiry of which to initiate the processing of digital content; an APPLY LATER command to cause a wait until a further manifest is received; an APPLY NEVER command to cause cancellation of a prior APPLY command; an APPLY DEPENDING command to cause the processing of digital content when a condition is met; an APPLY MAYBE command to cause the processing of digital content at least pseudo-randomly distributed over a population of data processing devices; or a DO NOT APPLY command to cause the data content payload to be retained without performing an action.

The atomic action may comprise a transactional sequence of requests and responses with a user mediated by a helper program. For example, a manifest may contain an executable "helper" to assist a user in structuring and applying updates to data processing device by means of a transactional dialogue.

Applying at least one update may comprise completely replacing an element of the digital content, or reversing a prior update. Applying an update may comprise applying a chain of updates, wherein the at least two digital content manifests enforce atomicity of said chain of updates.

Applying at least one update may comprise applying an update contained in at least one digital content payload from one of the plural sources being authenticated by a digital content manifest from a different one of the plural sources. Thus, for example, a payload from a device manufacturer may have the manifest provided by the device manufacturer "wrapped" within a manifest provided by the owner of a group of devices who has added local modifications to the payload, thus, by means of the wrapped manifest structure, providing the owner's credentials in addition to those of the device manufacturer. In one exemplary embodiment, a manifest may include a cryptographic hash of a further manifest, so that only the authority (for example, a public key signature) of the first manifest needs to be verified at the recipient device. To protect against malicious use, a bit-switch in the manifest may be used to indicate if a subsequent manifest is to be trusted based solely on such a hash verification.

Figure 2:
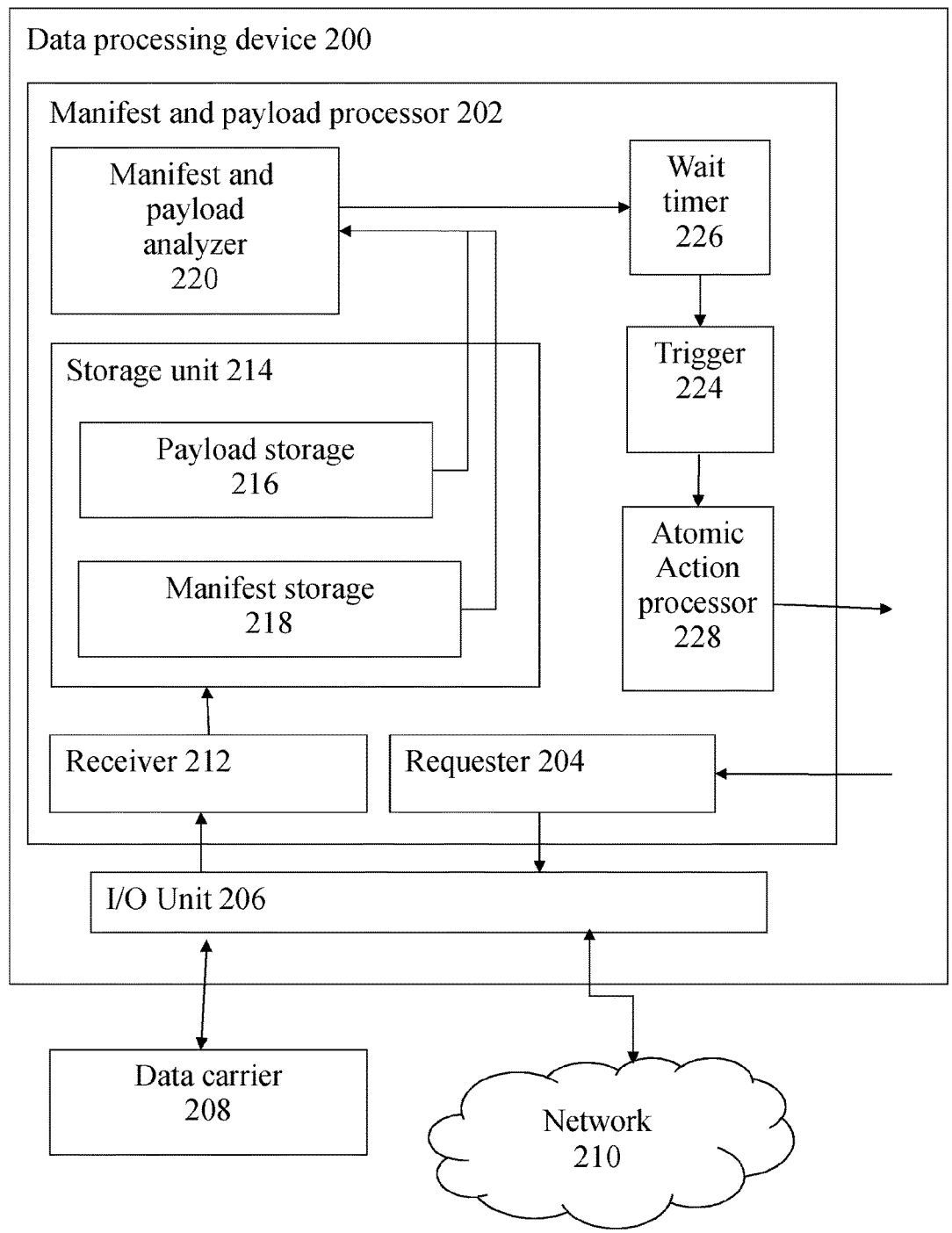
FIG. 2 shows one exemplary apparatus or arrangement of apparatus for processing digital content according to aspects of the disclosed technology.

In FIG. 2 there is shown a data processing component herein referred to as a manifest and payload processor 202 for controlling the processing of digital content from plural sources by at least one data processing device 200. Manifest and payload processor 202 may comprise, for example a specialised processor core or a library. Manifest and payload processor 202 is operable in conjunction with the data processing device's I/O unit 206 to communicate outside the data processing device 200 with data carrier 208, which may be, for example a USB mass storage device, or data-stick. Manifest and payload processor 202 may also, or alternatively, be operable in conjunction with the data processing device's I/O unit 206 to communicate outside the data processing device 200 with network 210, which may be, for example, a local network or a wider network, such as the Internet. In one exemplary embodiment of the disclosed technology, requester 204 is operable in response to instruction from data processing device 200 to pass requests for data content through I/O unit 206 to an external source of content, such as data carrier 208 or network 210.

Receiver 212 is operable to receive data content payloads and manifests from external sources of content, such as data carrier 208 or network 210. Receiver 212 passes payloads and manifests to, respectively, payload storage 216 and manifest storage 218 within storage unit 214. Storage unit 214 may comprise any form of data storage unit, for example, a random-access memory within manifest and payload processor 202 or outside manifest and payload processor 202 but within data processing unit 200. In an alternative, storage unit 214 may comprise an external storage unit accessible via a connection from manifest and payload processor 202. Manifest and payload analyzer 220 is operable to analyze payloads and related manifests in storage unit 214 and to act in response to receipt into storage unit 214 of a completed manifest and payload structure to the wait timer 226 and then to activate trigger 224 which causes initiation of operations by atomic action processor 228. In one embodiment, wait timer may be activated to cause the operation of trigger 224 to be delayed for a specified period before triggering atomic action processor 228.

To introduce a first specific implementation of one aspect of the disclosed technology, consider the difficulties inherent in distributing firmware to data processing devices using various online and offline distribution methods. Virtually all firmware images can be divided into at least two parts: device-class data and device-specific data. Device-class data is common to all devices of a particular model and version. Device-specific data is information like radio parameters, calibration data, device secrets, etc. Device-class data can be subdivided further, into groups like data specific to a product class, a board, a board revision, or even every device from a particular manufacturer—common libraries, for example.

In the exemplary application, an IoT device receives a firmware update manifest. The manifest is a block of data, which describes the firmware update. The manifest is signed by a trusted authority to validate its authenticity. The manifest contains all the information that the IoT device requires to fetch and apply the firmware. The manifest contains a list of other manifests on which it depends. Each manifest references exactly one block of firmware data. Because of this, the dependencies of manifests are a proxy for the dependencies of the firmware.

Suppose there are a large number of networked smoke detectors in a commercial installation, such as an office building. Each smoke detector will contain provisioning information for, such as its physical location, calibration data, etc. Suppose that the format of this internal data has changed in the new version of the firmware. The smoke detector vendor will provide two firmware manifests to each device: one general manifest for the firmware update and one for the device-specific information. The general manifest will be configured to depend on the device-specific manifest.

When the smoke detector goes to apply the manifest, it will fetch the general firmware image and fetch any dependency manifests. It will repeat the same process for each dependency manifest.

In this example, this means that the smoke detector will have a manifest delivered, then it will fetch the general firmware and the device-specific manifest, then it will fetch the device specific data, and only then will it install the firmware.

In a "real-world" deployment of IoT devices, it is often desirable to perform updates at a specific time, for example, when contractors are present on the site where the devices are installed. If this is the case, the general manifest could be configured to depend on a second manifest, which references no data. In this case, the organization installing the new update could deliver all the data except for this second dependency manifest, which would be delivered when the manifest is validated.

It may also be useful to set a time after which a digital content payload is no longer valid. For example, if the digital content relates to a real-world event having a specific time or time period, and if the content delivery may be delayed for some reason, it may be possible to save local processing resources by making the content valid for only a limited period.

Figure 3:
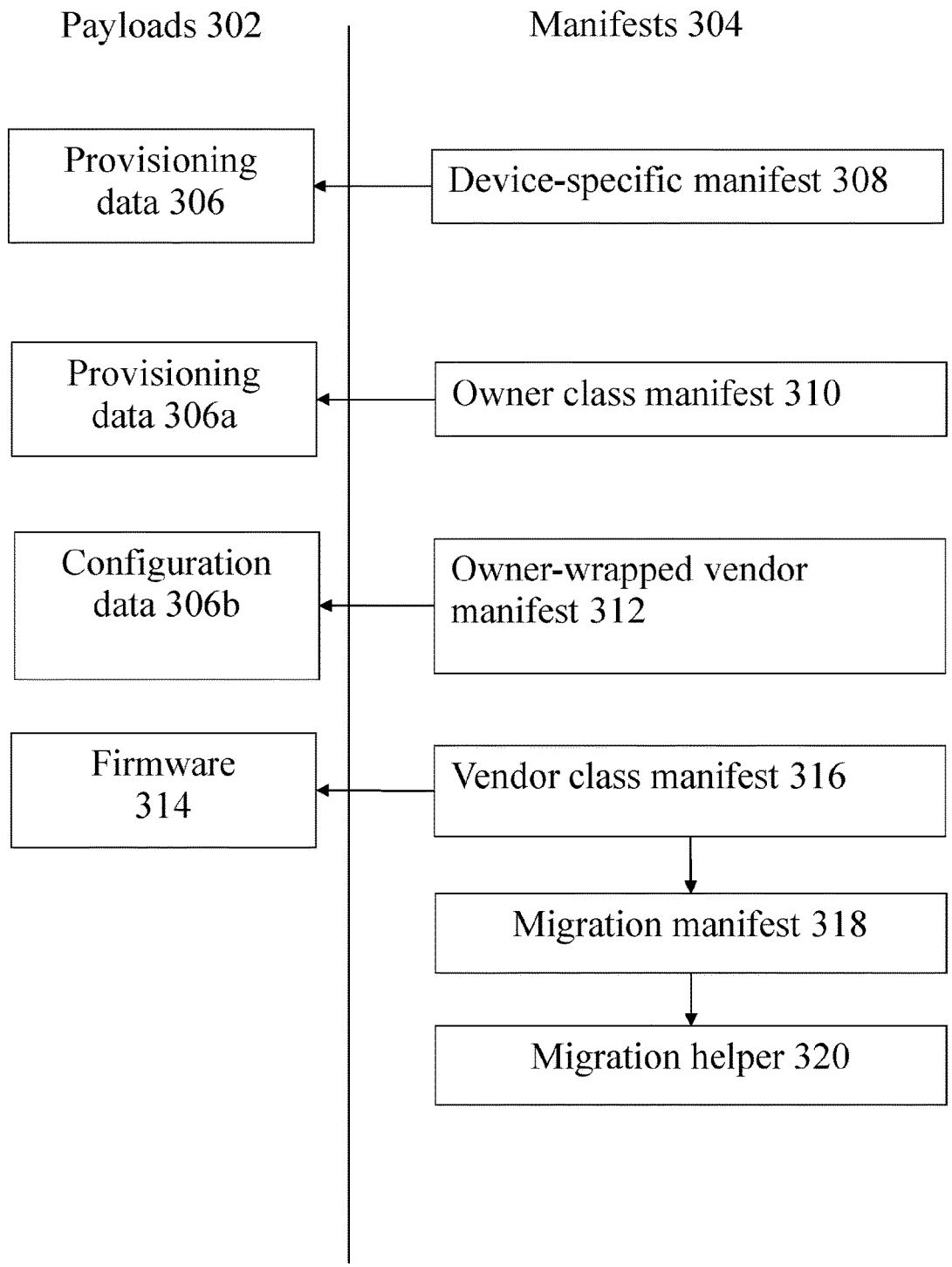
FIG. 3 shows examples of linked structures of manifests and payloads according to aspects of the disclosed technology.

Turning now to FIG. 3, and having regard to the foregoing description, there are shown examples of manifest 304 and payload 302 structures. First shown is a related structure of provisioning data 306 with a device-specific manifest 308. This structure allows for the delivery and control of provisioning payloads from, for example, device manufacturers, where the payloads are suitable for all members of the device class. Second shown is a related structure of provisioning data 306a with an owner class manifest 310. This structure allows for the delivery and control of provisioning payloads from, for example, device owners, where the payloads are suitable for all members of the device class owned by that owner. Third shown is a related structure of configuration data 306b with owner-wrapped vendor manifest 312. This structure allows for the delivery and control of configuration payloads from, for example, device owners, where the payloads are suitable for all members of the device class owned by that owner, but where the owner has incorporated a vendor manifest within its own manifest. Fourth shown is a related structure of a firmware payload 314 with a vendor class manifest 316 which incorporates a migration manifest 318 which is operable to initiate operation of a migration helper 320—an executable that interacts with a user to perform one or more atomic actions as described in detail above.

As will be appreciated by one skilled in the art, aspects of the present technology may be embodied as a system, method or computer program product. Accordingly, aspects of the present technology may take the form of an entirely hardware embodiment, an entirely software embodiment, or an embodiment combining software and hardware aspects.

Furthermore, aspects of the present technology may take the form of a computer program product embodied in a computer readable medium having computer readable program code embodied thereon. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing.

Computer program code for carrying out operations for aspects of the present technology may be written in any combination of one or more programming languages, including object oriented programming languages and conventional procedural programming languages. The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present technology may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present technology may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present technology may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present invention.

The invention claimed is:

1. A machine-implemented method for controlling processing of digital content from plural sources by at least one data processing device, the method comprising:
    receiving, at said data processing device, at least two dependent digital content manifests;
    receiving, at said data processing device, at least one digital content payload, each of the at least one digital content payloads specified by a digital content manifest of the at least two dependent digital content manifests;
    determining whether to trigger an atomic action based on the availability of all dependent digital content manifests and the specified at least one digital content payload; and
    triggering, responsive to said determining, the atomic action using said at least one digital content payload.

2. The machine-implemented method as claimed in claim 1, wherein said triggering the atomic action comprises applying at least one update to at least one digital content item.

3. The machine-implemented method as claimed in claim 2, wherein said applying at least one update comprises completely replacing an element of said digital content.

4. The machine-implemented method as claimed in claim 2, wherein said applying at least one update comprises reversing a prior update.

5. The machine-implemented method as claimed in claim 2, wherein said applying at least one update comprises applying a chain of updates, and wherein said at least two dependent digital content manifests enforce atomicity of said chain of updates.

6. The machine-implemented method as claimed in claim 2, wherein said applying at least one update comprises applying an update contained in at least one digital content payload from one of said plural sources being authenticated by a digital content manifest from a different one of said plural sources.

7. The machine-implemented method as claimed in claim 1, wherein said triggering the atomic action comprises applying no update to at least one digital content item.

8. The machine-implemented method as claimed in claim 1, wherein said processing of digital content is controlled by at least one of:
    an APPLY NOW command to cause said processing of digital content immediately;
    an APPLY TIMER command to set a timer on expiry of which to initiate said processing of digital content;
    an APPLY LATER command to cause a wait until a further manifest is received;
    an APPLY NEVER command to cause cancellation of a prior APPLY command;
    an APPLY DEPENDING command to cause said processing of digital content when a condition is met;
    an APPLY MAYBE command to cause said processing of digital content at least pseudo-randomly distributed over a population of data processing devices; and
    a DO NOT APPLY command to cause said digital content payload to be retained without performing an action.

9. The machine-implemented method as claimed in claim 1, wherein said triggering the atomic action comprises performing a transactional sequence of requests and responses with a user mediated by a helper program.

10. The machine-implemented method as claimed in claim 1, wherein said at least one data processing device is a member node of a communications network.

11. The machine-implemented method as claimed in claim 10, wherein said communications network comprises one of a tree structure or a mesh structure of member nodes.

12. The machine-implemented method as claimed in claim 11, wherein said digital content is communicated as a point to point transmission.

13. The machine-implemented method as claimed in claim 11, wherein said digital content is communicated as a broadcast.

14. The machine-implemented method as claimed in claim 13, wherein said digital content is operable only by recipient nodes.

15. The machine-implemented method as claimed in claim 14, wherein at least one of said member nodes selectively routes said digital content onward only if an onward member node is identifiable as a recipient node.

16. The machine-implemented method as claimed in claim 1, wherein said receiving at least two digital content manifests and said receiving at least one digital content payload are responsive to a prior request by said at least one data processing device.

17. The machine-implemented method as claimed in claim 1, wherein said receiving at least one digital content payload comprises one or more of receiving configuration data for said data processing device and receiving provisioning data for said data processing device.

18. The machine-implemented method as claimed in claim 1, wherein said receiving at least two digital content manifests comprises one or more of receiving a certificate authority list and receiving a key revocation list.

19. A data processing component for controlling the processing of digital content from plural sources by at least one data processing device, comprising:
   a receiver to:
      receive at least two dependent digital content manifests, and
      receive at least one digital content payload, each of the at least one digital content payloads specified by a digital content manifest of the at least two dependent digital content manifests; and
   an atomic action processor to:
      determine whether to trigger an atomic action based on the availability of all dependent digital content manifests and the specified at least one digital content payload, and
      trigger, responsive to the determining, the atomic action using said at least one digital content payload.

20. A computer program product, stored in a non-transitory computer-readable medium and comprising computer program code to, when loaded into a computer system and executed thereon, cause said computer system to perform a method for controlling the processing of digital content from plural sources by at least one data processing device, the method comprising:
   receiving, at said data processing device, at least two dependent digital content manifests;
   receiving, at said data processing device, at least one digital content payload, each of the at least one digital content payloads specified by a digital content manifest of the at least two dependent digital content manifests;
   determining whether to trigger an atomic action based on the availability of all dependent digital content manifests and the specified at least one digital content payload; and
   triggering, responsive to said determining, the atomic action using said at least one digital content payload.

* * * * *